United States Patent
Bagal et al.

(10) Patent No.: US 10,789,149 B2
(45) Date of Patent: *Sep. 29, 2020

(54) DUPLICATE BUG REPORT DETECTION USING MACHINE LEARNING ALGORITHMS AND AUTOMATED FEEDBACK INCORPORATION

(71) Applicant: Oracle International Corporation, Redwood Shores, CA (US)

(72) Inventors: Prasad V. Bagal, Saratoga, CA (US); Sameer Arun Joshi, San Jose, CA (US); Hanlin Daniel Chien, San Jose, CA (US); Ricardo Rey Diez, Zapopan (MX); David Cavazos Woo, Zapopan (MX); Emily Ronshien Su, Mountain View, CA (US); Sha Chang, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/383,405

(22) Filed: Apr. 12, 2019

(65) Prior Publication Data
US 2019/0235987 A1 Aug. 1, 2019

Related U.S. Application Data

(63) Continuation of application No. 14/992,831, filed on Jan. 11, 2016, now Pat. No. 10,379,999.

(51) Int. Cl.
G06F 11/36 (2006.01)
(52) U.S. Cl.
CPC ........ *G06F 11/362* (2013.01); *G06F 11/3692* (2013.01)

(58) Field of Classification Search
CPC .. G06F 11/079; G06F 11/3692; G06F 11/362; G06F 11/3668
See application file for complete search history.

(56) References Cited

U.S. PATENT DOCUMENTS

| 7,401,080 B2 | 7/2008 | Benton et al. |
| 7,735,068 B2 * | 6/2010 | Siddaramappa .... G06F 11/3604 715/230 |

(Continued)

FOREIGN PATENT DOCUMENTS

CN 103970666 A 8/2014

OTHER PUBLICATIONS

Wang et al., "An Approach to Detecting Duplicate Bug Reports using Natural Language and Execution Information", An Approach to Detecting Duplicate Bug Reports using Natural Language and Execution Information, 2008, pp. 461-470.

(Continued)

*Primary Examiner* — S. Sough
*Assistant Examiner* — Cheneca Smith
(74) *Attorney, Agent, or Firm* — Invoke

(57) ABSTRACT

Duplicate bug report detection using machine learning algorithms and automated feedback incorporation is disclosed. For each set of bug reports, a user-classification of the set of bug reports as including duplicate bug reports or non-duplicate bug reports is identified. Also for each set of bug reports, correlation values corresponding to a respective feature, of a plurality of features, between bug reports in the set of bug reports is identified. Based on the user-classifications and the correlation values, a model is generated to identify any set of bug reports as including duplicate bug reports or non-duplicate bug reports. The model is applied to classify a particular bug report and a candidate bug report as duplicate bug reports or non-duplicate bug reports.

21 Claims, 8 Drawing Sheets

(56) References Cited

U.S. PATENT DOCUMENTS

| | | | |
|---|---|---|---|
| 8,453,027 B2 | 5/2013 | Bartz et al. | |
| 9,256,512 B1 | 2/2016 | Shiraishi | |
| 9,379,951 B2 | 6/2016 | Mihnev | |
| 2007/0130561 A1* | 6/2007 | Siddarampappa | G06F 8/10 717/106 |
| 2010/0191731 A1 | 7/2010 | Rus et al. | |
| 2010/0218049 A1 | 8/2010 | Mostow | |
| 2011/0066908 A1 | 3/2011 | Bartz et al. | |
| 2012/0137182 A1 | 5/2012 | Zhang et al. | |
| 2012/0239981 A1 | 9/2012 | Franke et al. | |
| 2014/0075244 A1 | 3/2014 | Takahashi | |
| 2015/0058826 A1 | 2/2015 | Hu et al. | |
| 2015/0199224 A1 | 7/2015 | Mihnev | |
| 2016/0321586 A1 | 11/2016 | Herzig et al. | |

OTHER PUBLICATIONS

Wang et al. "An approach to detecting duplicate bug reports using natural language and execution information." Proceedings of the 30th international conference on Software engineering. ACM, 2008. Retrieved on [Jan. 17, 2019] Retrieved from the Internet:URL< https://dl.acm.org/citation.cfm?id=1368151> (Year: 2008).

Tian et al., "Improved Duplicate Bug Report Identification", 16th European Conference on Software Maintenance and Reengineering, IEEE Computer Society, 2012, pp. 385-390.

Sureka et al., "Detecting Duplicate Bug Report Using Character N-Gram-Based Features", Asia Pacific Software Engineering Conference, IEEE Computer Society, 2010, pp. 366-374.

Sun et al., "Towards More Accurate Retrieval of Duplicate Bug Reports", ASE '11 Proceedings of the 2011 26th IEEE / ACM International Conference on Automated Software Engineering, 2011, Online Available at <http://dl.acm.org/citation.cfm?id=2190180 &CFID=507204116&CFTOKEN=24505802>, retrieved on Apr. 29, 2015, pp. 253-262.

Sun et al. "A discriminative model approach for accurate duplicate bug report retrieval." Proceedings of the 32nd ACM/IEEE International Conference on Software Engineering—vol. 1. ACM, 2010. Retrieved on [Jan. 17, 2019] Retrieved from the Internet: URL<https://dl.acm.org/citation.cfm?id=1806811> (Year: 2010).

Ritchey et al., "Classification Algorithms for Detecting Duplicate Bug Reports in Large Open Source Repositories", Youngstown State University, CREU Final Reports, 2014, 6 pages.

Nguyen et al., "Duplicate Bug Report Detection with a Combination of Information Retrieval and Topic Modeling", ASE 2012 Proceedings of the 27th IEEE/ACM International Conference on Automated Software Engineering, 2012, Online Available at <http://dl.acm.org/citation.cfm?id=2351687>, retrieved on Apr. 29, 2015, pp. 70-79.

Jalbert et al., "Automated Duplicate Detection for Bug Tracking Systems", Dependable Systems and Networks With FTCS and DCC, DSN 2008. IEEE International Conference, Jun. 24-27, 2008, pp. 52-61.

Bronevetsky et al., "Automatic Fault Characterization via Abnormality-Enhanced Classification", Dependable Systems and Networks {DSN), 42nd Annual IEEE/IFIP International Conference, Jun. 25-28, 2012, pp. 1-12.

Anahita et al., "A Contextual Approach Towards More Accurate Duplicate Bug Report Detection", Proceeding MSR 13 Proceedings of the 10th Working Conference on Mining Software Repositories, 2013, Online Available at <http://dl.acm.org/citation.cfm?id=2487085. 2487123&coll=DL&dl=GUIDE&CFID=507204116&CFTOKEN= 24505802>, Retrieved on Apr. 29, 2015, pp. 183-192.

Amoui et al., "Search-Based Duplicate Defect Detection: An Industrial Experience", Mining Software Repositories (MSR), 2013 1oth IEEE Working Conference, May 18-19, 2013, pp. 175-164.

* cited by examiner

| Bug Report ID | Bug Report ID | Correlation Value for Feature A | Correlation Value for Feature B | Correlation Value for Feature C | User-Classification |
|---|---|---|---|---|---|
| 32 | 46 | 0.6 | 0.7 | 0.2 | 1 |
| 35 | 68 | 0.5 | 0.9 | 0.4 | 0 |
| 67 | 43 | 0.4 | 0.6 | 0.3 | 1 |

Columns 222 — (Bug Report ID columns)
Columns 224 — (Correlation Value columns)
Column 226 — (User-Classification)
Pair 212, Pair 213, Pair 214
Table 210

FIG. 2B

DUPLICATE BUG REPORT DETECTION USING MACHINE LEARNING ALGORITHMS AND AUTOMATED FEEDBACK INCORPORATION

INCORPORATION BY REFERENCE; DISCLAIMER

The following application is hereby incorporated by reference: application Ser. No. 14/992,831 filed on Jan. 11, 2016. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to managing duplicate bug reports. In particular, the present disclosure relates to duplicate bug report detection using machine learning algorithms and automated feedback incorporation.

BACKGROUND

Software and/or hardware defects, which are found during testing and/or use of programs and/or hardware, are logged in bug reports. A same software and/or hardware defect may be found by different users and/or different systems. Furthermore, the same defect may result in different errors within different executing instances of an application. As a result, multiple bug reports on the same defect are often filed. Multiple bug reports on the same software and/or hardware defect are referred to herein as "duplicate bug reports." If test engineers and/or users are not aware that the multiple bug reports refer to the same defect, then each of a set of duplicate bug reports is handled independently. The independent handling of duplicate bug reports creates inefficiencies in the debugging and development process.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 2B illustrates an example set of correlation values for various features of a set of bug reports, in accordance with one or more embodiments;

DETAILED DESCRIPTION

Figure 1:
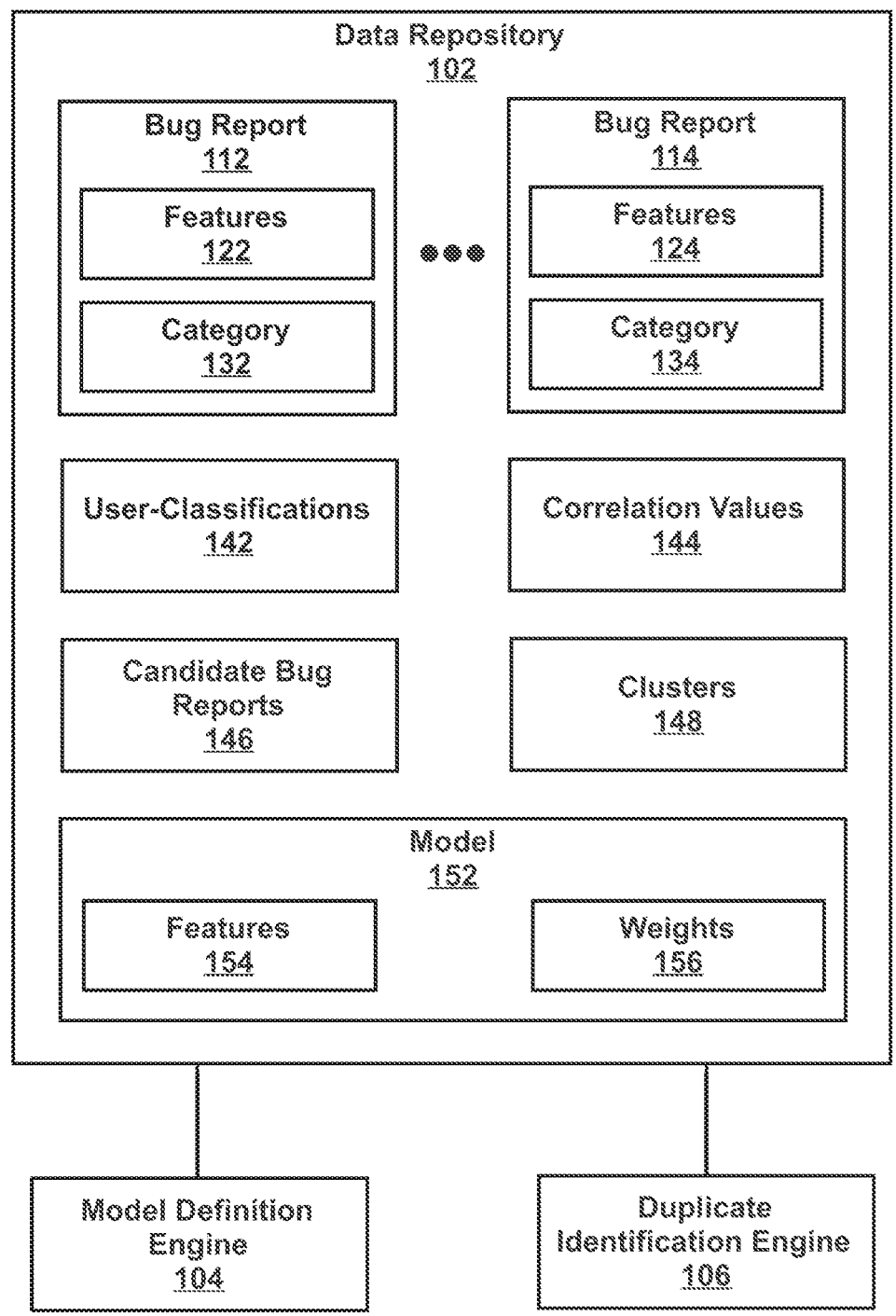
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. GENERATING A BUG CLASSIFICATION MODEL
4. IDENTIFYING A SET OF CANDIDATE BUG REPORTS
5. CLASSIFYING A PARTICULAR BUG REPORT USING A BUG CLASSIFICATION MODEL AND A SET OF CANDIDATE BUG REPORTS
6. MODIFYING A BUG CLASSIFICATION MODEL
7. MISCELLANEOUS; EXTENSIONS
8. HARDWARE OVERVIEW

1. General Overview

In one or more embodiments, a bug classification model is used to classify a pair of bug reports as duplicate bug reports or non-duplicate bug reports. A bug classification model includes a set of weights corresponding to each of a set of features of a bug report. The set of weights may be applied respectively to a set of correlation values for the set of features across a pair bug reports. The application of the set of weights to the respective set of correlation values computes to a determination of the pair of bug reports as being duplicate bug reports or non-duplicate bug reports.

In one or more embodiments, a bug classification model is generated using a training set of bug reports. The training set of bug reports includes (a) pairs of bug reports and (b) user-classifications for each pair identifying each pair as duplicate bug reports or non-duplicate bug reports. Each bug report is associated with a set of features. A correlation value is determined for each feature across each pair of bug reports. A set of weights, corresponding to each feature, is determined such that application of the weights to the correlation values results in the maximum number of pairs of bug reports being classified (as duplicates or non-duplicates) according to the corresponding user-classification. The bug classification model is generated using the set of weights.

In one or more embodiments, a set of candidate bug reports are selected from a set of existing bug reports for determining whether a particular bug report is a duplicate of any of the set of candidate bug reports. If the particular bug report is not identified as a duplicate of any of the set of candidate bug reports, then the particular bug report is classified as a unique bug report (e.g., not a duplicate of any existing bug report). A particular category associated with the particular bug report is identified. A first set of bug reports in the particular category is identified. A second set of bug reports that have been previously identified as duplicates of at least one bug report in the first set of bug reports are identified. Categories associated with each of the second set of bug reports are identified. Bug reports in the identified categories are included in the set of candidate bug reports for the particular bug report.

In one or more embodiments, the bug classification model is applied to determine whether the particular bug report and a candidate bug report are duplicate bug reports or non-duplicate bug reports. The particular bug report is compared to (a) the candidate bug report and (b) each bug report that has been previously identified as a duplicate of the candidate bug report. A correlation value is determined for each feature between the particular bug report and the candidate bug report. A correlation value is also determined for each feature between the particular bug report and each duplicate bug report of the candidate bug report. From the multiple correlation values for each feature, a highest correlation value is selected for each feature. The bug classification model is applied to the selected correlation values to determine an overall correlation value between the particular bug report and the candidate bug report. Based on the overall correlation value, the particular bug report and the candidate bug report are determined to be duplicate bug reports or non-duplicate bug reports.

In one or more embodiments, user feedback is received verifying a system-classification of a pair of bug reports. Based on the user feedback, a new training set of bug reports is generated. Based on the new training set of bug reports, the bug classification model is revised. The revised bug classification model may use a different set of features and/or a different set of weights than a previous bug classification model.

2. Architectural Overview

FIG. 1 illustrates a system 100 in accordance with one or more embodiments. As illustrated in FIG. 1, system 100 includes data repository 102, model definition engine 104, and duplicate identification engine 106. In one or more embodiments, system 100 may include more or fewer components than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In one or more embodiments, data repository 102 is any type of storage unit and/or device (e.g., a file system, database, collection of tables, or any other storage mechanism) for storing data. Further, data repository 102 may include multiple different storage units and/or devices. The multiple different storage units and/or devices may or may not be of the same type or located at the same physical site. Further, data repository 102 may be implemented or may execute on the same computing system as model definition engine 104 and/or duplicate identification engine 106. Alternatively or additionally, data repository 102 may be implemented or executed on a separate computing system than model definition engine 104 and/or duplicate identification engine 106. Data repository 102 may be connected to model definition engine 104 and/or duplicate identification engine 106 via a direct connection or via a network.

Data sets describing bug report 112, bug report 114, user-classifications 142, correlation values 144, candidate bug reports 146, clusters 148, and model 152 may be implemented across any of components within system 100. However, these data sets are illustrated within data repository 102 for purposes of clarity and explanation.

In one or more embodiments, a bug report (such as bug report 112 and bug report 114) is a report describing a software and/or hardware defect. The bug report may be generated by a person via a user interface and/or by a system that detected the defect. In an embodiment, the bug reports stored in data repository 102 include an initial training set of bug reports, used to initially generate model 152. The bug reports stored in data repository 102 also include bug reports that were previously received over a prior time period. These bug reports form a new training set of bug reports, used to revise model 152. A particular bug report may be compared to the previously-received bug reports, to determine whether the particular bug report is a duplicate of any of the previously-received bug reports. The particular bug report, to be compared, may be referred to herein as an "input bug report."

In an embodiment, a bug report is associated with one or more features (such as feature 122 and features 124). Each feature describes an attribute of a defect. Example features include a title of the bug report, a textual description of the defect, an error code that is returned due to the defect, a time and date at which the defect occurred, an identifier of a person and/or program that detected the defect, a severity of the defect, and a reproducibility of the defect.

In an embodiment, a bug report indicates a value for each feature. In an example, a particular bug report indicates that a title is "Crash on open," and an error code is "0x33." The value for the title indicated by the particular bug report is "Crash on open." The value for the error code indicated by the particular bug report is "0x33."

In an embodiment, a bug report is associated with a category (such as category 132 and category 134). A category is a program which detected the defect, generated an error corresponding to the defect, and/or originated the bug report. Example categories include a product, a product version, and a platform and/or operating system executing the product.

In one or more embodiments, user-classifications 142 include user input indicating whether a group of bug reports (such as, a pair of bug reports) are duplicates or non-duplicates. User-classifications 142 include user input indicating whether a group of bug reports in an initial training set of bug reports are duplicates or non-duplicates. User-classifications 142 may also include user input indicating whether a particular bug report and one or more previously-received bug reports are duplicates or non-duplicates.

In one or more embodiments, correlation values 144 are associated with features of a bug report (such as features 122 and features 124). A correlation value for a particular feature is a measure of the similarity (or correlation) between values for the particular feature indicated by two or more bug reports. A correlation value for a particular feature may include a numerical representation of a correlation for values of the particular feature between two or more bug reports.

In one or more embodiments, candidate bug reports 146 are a subset of previously-received bug reports. Model 152 is to be applied to candidate bug reports 146 for determining whether a particular bug report is a duplicate of any of the candidate bug reports. In an embodiment, candidate bug reports 146 are determined to have a level of relevancy to the particular bug report that is higher than other previously-received bug reports. The level of relevancy is determined based on operations other than the application of model 152, such as an evaluation of the categories associated with the bug reports. Previously-received bug reports, with a level of relevancy above a threshold value, are selected as candidate bug reports. Applying model 152 to candidate bug reports 146 (rather than all previously-received bug reports) makes the process of identifying duplicates more efficient. Furthermore, the risk of model 152 incorrectly classifying a previously-received bug report with a low level of relevancy as a duplicate of the particular bug report is removed.

In one or more embodiments, clusters 148 are sets of one or more bug reports that have previously been identified, by a person and/or model 152, as duplicates. A cluster associated with a candidate bug report includes the candidate bug report itself and zero or more bug reports that have been identified as a duplicate of the candidate bug report.

In one or more embodiments, model 152 is a bug report classification model for classifying a pair of bug reports as duplicate bug reports or non-duplicate bug reports. Model 152 includes (a) features 154 and (b) weights 156 to be applied to correlation values associated with features 154. In an embodiment, model 152 is applied to a particular bug report and a cluster associated with a candidate bug report in order to determine whether the particular bug report and the candidate bug report are duplicates or non-duplicates.

In an embodiment, weights 156 are values that are applied to correlation values 144 (described above) corresponding to features 154. Weights 156 may be referred to herein as "weight assignments." A different weight may be assigned to each correlation value corresponding to each respective feature. Model 152 may define weights for all features in bug reports or a subset of features within a bug report. Accordingly, features 154 may correspond to all or a subset of features 122-124. Model 152 may be generated, applied, and revised as described below with reference to FIGS. 2A-5B.

In one or more embodiments, model definition engine 104 refers to hardware and/or software configured to perform operations described herein for generating and/or modifying model 152. Operations for generating and/or modifying model 152 are described below with reference to FIGS. 1, 5A and 5B.

In one or more embodiments, duplicate identification engine 106 refers to hardware and/or software configured to perform operations described herein for classifying a particular bug report as a duplicate of any previously-received bug report using model 152. Operations for classifying the particular bug report as a duplicate or non-duplicate are described below with reference to FIGS. 2A, 2B, 3, and 4.

In an embodiment, model definition engine 104 and/or duplicate identification engine 106 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a mainframe, a television, a content receiver, a set-top box, a printer, a mobile handset, a smartphone, and a personal digital assistant ("PDA").

3. Generating a Bug Classification Model

Figure 2A:
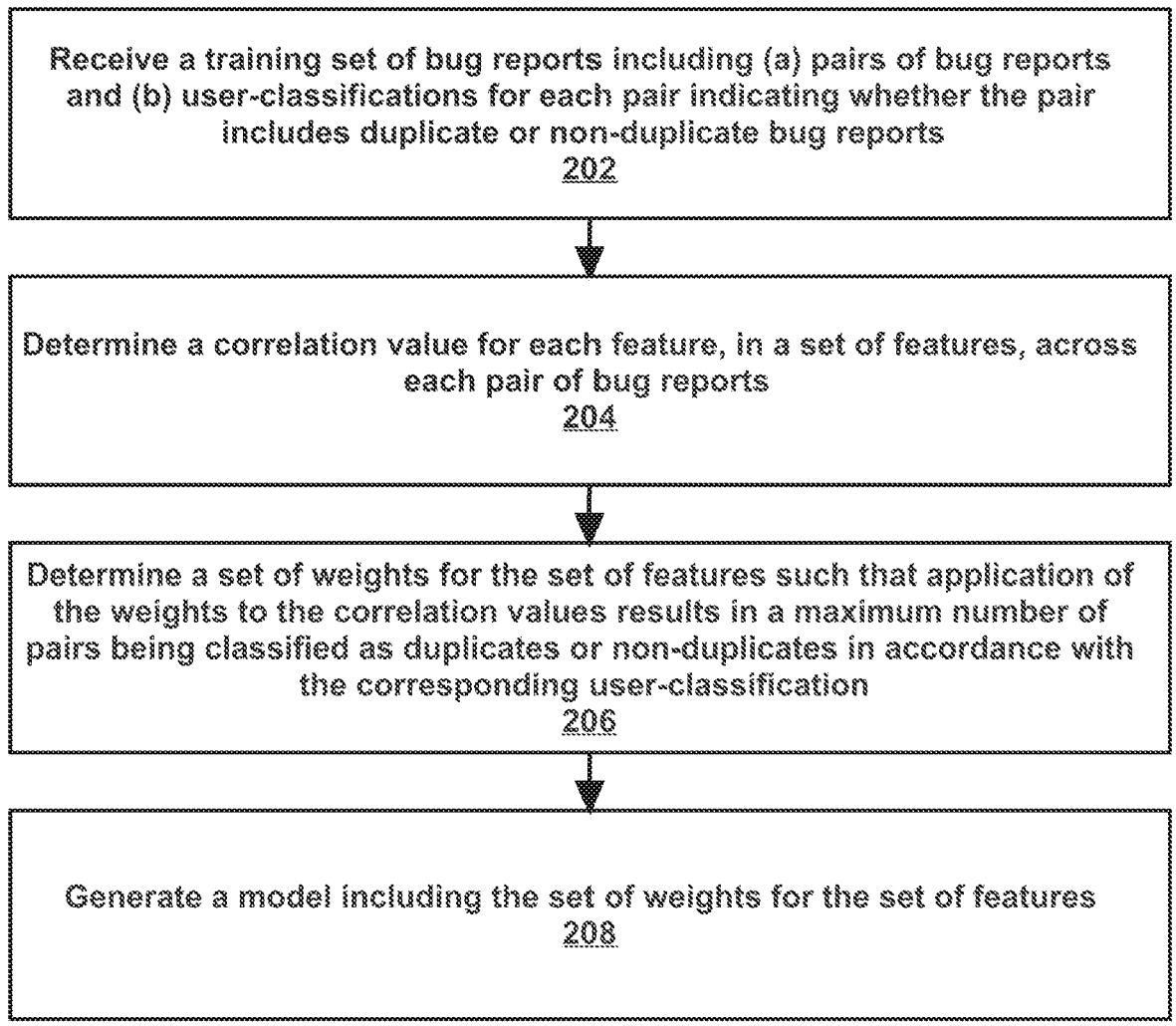
FIG. 2A illustrates an example set of operations for generating a bug report classification model, in accordance with one or more embodiments.

FIG. 2A illustrates an example set of operations for generating a bug report classification model, in accordance with one or more embodiments. One or more operations illustrated in FIG. 2A may be modified, rearranged, or omitted all together. Accordingly, the particular sequence of operations illustrated in FIG. 2A should not be construed as limiting the scope of one or more embodiments.

Initially, a training set of bug reports is received, in accordance with one or more embodiments. The training set of bug reports includes (a) pairs of bug reports and (b) user-classifications for each pair (Operation 202). The user-classification for a pair indicate whether the pair includes duplicate bug reports or non-duplicate bug reports. The training set of bug reports may be received, for example, as user input via a user interface. In another example, the training set of bug reports may be uploaded to the system or otherwise transmitted to the system.

In one or more embodiments, a correlation value for each feature, in a set of features, is determined across each pair of bug reports (Operation 204). Values for each feature indicated by each bug report are determined. A first value for a particular feature indicated by a first bug report is compared to a second value for the particular feature indicated by a second bug report in order to determine a correlation value for the particular feature.

In an embodiment, textual values are processed through natural language processing prior to being compared against each other. Examples of natural language processing include finding synonyms and word stemming. Through natural language processing, a textual value is parsed. Words and/or terms in the textual value are stored as tokens. The tokens in a first textual value are then compared to the tokens in a second textual value.

In an example, a textual value for a description of a defect in a bug report is, "An empty string (rather than the text previously entered) is returned on the screen." The textual value is compared to a table of synonyms. If the table indicates a synonym for a particular word in the textual value, then the particular word may be substituted with the synonym. The table indicates that "earlier" is a synonym of "previously." Hence, the word "previously" is substituted with the word "earlier."

Continuing this example, the textual value is also compared to a table of word stems. A word stem is a root and/or base of a word. The table indicates that "earl" is a word stem of the word "earlier." Hence, "earl" is found to be a token included in the textual value.

In an embodiment, the tokens of two textual values, indicated by two bug reports, are compared to each other to determine a correlation value between the two textual values. A cosine similarity computation may be used to determine the correlation value. A cosine similarity computation uses the following variables:

Variable A=Number of identical tokens for the particular feature found in the two bug reports;

Variable B=Total number of tokens for the particular feature found in one of the two bug reports;

Variable C=Total number of tokens for the particular feature found in the other of the two bug reports.

Using the above variables, the correlation value may be computed using the cosine similarity computation as follows:

$$\frac{\text{Variable } A}{\sqrt{\text{Variable } B} \times \sqrt{\text{Variable } C}}.$$

While a cosine similarity computation is described herein, other computations may be used to determine a correlation value.

In an example, a first title of a first report includes the tokens kill, linux, restart, and node. A second title of a second report includes option, specifici, linux, fail, node. The number of same tokens is two (that is, linux and node).

The total number of tokens in the first title is four. The total number of tokens in the second title is five. The correlation value is $$\frac{2}{\sqrt{4} \times \sqrt{5}} = 0.63.$$

In one or more embodiments, a set of weights for the set of features are determined such that application of the weights to the correlation values results in a maximum number of pairs being classified (as duplicates or non-duplicates) in accordance with the corresponding user-classification (Operation 206). Techniques such as machine learning, logistic regression, and linear regression are used to determine the set of weights.

In an embodiment, logistic regression is used to determine the set of weights. A set of weights $(\beta_0, \beta_1, \ldots, \beta_N)$ are found such that a logistic curve that is a function of the weights best fits a graph of the correlation values versus the user-classifications. A user-classification of "1" indicates a pair of duplicates, while a user-classification of "0" indicates a pair of non-duplicates. The logistic curve is represented by $$\frac{1}{1+e^{-t}},$$

wherein t is a cross-product of the weights and the correlation values. That is, $t=\beta_0+\beta_1\times$(correlation value for Feature 1)+ . . . +$\beta_N\times$(correlation value for Feature N). Other than a leading weight $(\beta_0)$ (which may be zero or non-zero), each of the remaining weights $(\beta_1, \ldots, \beta_N)$ corresponds to one of the features (Feature 1, . . . , Feature N).

In one or more embodiments, a bug classification model is generated including the set of weights for the set of features (Operation 208). The model includes the weights as fixed constants. Generating the model includes storing the weights with the corresponding features within a data structure. In an example, generating the model includes generating a table. The table maps the weights to the corresponding features. The weights are to be applied to the correlation values for the corresponding features between any two bug reports, in order to determine an overall correlation value between the two bug reports.

In an embodiment, the bug classification model includes a threshold value, which is to be compared against the overall correlation value between two bug reports. The threshold value is specified by a person via a user interface. Alternatively, the threshold value is a mean of (a) a first value that was used during a training phase to represent a user-classification indicating a pair of bug reports are duplicates (such as "1") and (b) a second value that was used during the training phase to represent a user-classification indicating a pair of bug reports are non-duplicates (such as "0"). Alternatively, the threshold value is determined such that a maximum number of pairs of bug reports, in the training set, are classified (as duplicates or non-duplicates) in accordance with the corresponding user-classification.

In an example, as illustrated in FIG. 2B, a set of correlation values for various features of a training set of bug reports are determined. Table 210 shows columns 222, columns 224, and column 246. Columns 222 indicate identifiers (IDs) of bug reports. Columns 224 indicate correlation values for feature A, feature B, and feature C, between the corresponding bug reports. Column 226 indicate user-classifications associated with the corresponding bug reports, wherein "1" indicates that user input has classified the bug reports as duplicates and "0" indicates that user input has classified the bug report as non-duplicates.

As illustrated, pair 212 includes bug report ID 32 and bug report ID 46. The correlation value for feature A between bug report ID 32 and bug report ID 46 is 0.6. The correlation value for feature B between bug report ID 32 and bug report ID 46 is 0.7. The correlation value for feature C between bug report ID 32 and bug report ID 46 is 0.2. The user-classification for bug report ID 32 and bug report ID 46 is 1. Similarly, pair 214 and pair 216 are shown. Correlation values and user-classifications for pair 214 and pair 216 are shown.

Logistic regression is then applied to the values shown in table 210. A set of weights $(\beta_0, \beta_1, \beta_2, \beta_3)$ for a logistic curve that best fits the values shown in table 210 is found. The logistic curve is represented by $$\frac{1}{1+e^{-t}},$$

wherein t is a cross-proauct of the weights and the correlation values. That is, $t=\beta_0+\beta_1\times$(correlation value for Feature A)+$\beta_2\times$(correlation value for Feature B)+$\beta_3\times$(correlation value for Feature C). The set of weights $(\beta_0, \beta_1, \beta_2, \beta_3)$ are found to be (44.77, 20.72, −54.77, −37.79). The set of weights (44.77, 20.72, −54.77, −37.79) are then included in the bug classification model.

Applying the set of weights to each of the pairs 212-214, each pair is classified (as duplicates or non-duplicates) in accordance with the corresponding user-classification. Using pair 212 as an example, the set of weights are applied to the correlation values for Feature A, Feature B, and Feature C, across pair 212. That is:

$t=\beta_0+\beta_1\times$(correlation value for Feature *A* across pair 212)+(32×(correlation value for Feature *B* across pair 212)+$\beta_3\times$(correlation value for Feature *C* across pair 212);

$t=44.77+(20.72\times0.6)+(-54.77\times0.7)+(-37.79\times0.2);$ $t=11.31.$

The overall correlation value across pair 212 is determined by inserting the value of t into the logistic curve, $$\frac{1}{1+e^{-t}}.$$

The overall correlation value would be 1.0. The threshold value in this model is, for example, 0.5. Since the overall correlation value 1.0 is greater than the threshold value 0.5, pair 212 is classified as duplicate bug reports (also referred to herein as a "system-classification"). The system-classification would then be in accordance with the user-classification, which also indicates that pair 212 includes duplicate bug reports.

Example operations for applying the bug classification model are described with reference to FIG. 4.

4. Identifying a Set of Candidate Bug Reports

Figure 3:
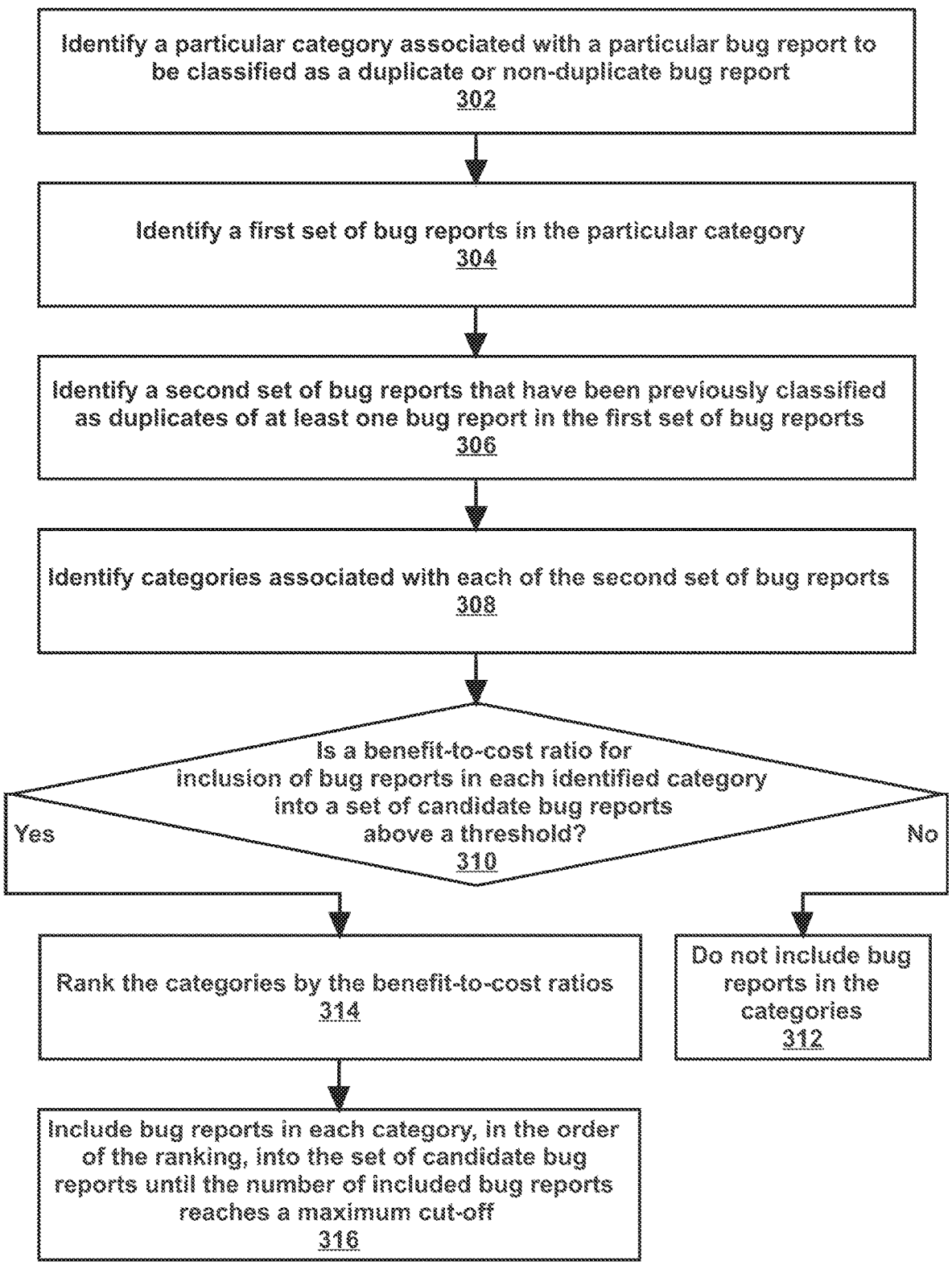
FIG. 3 illustrates an example set of operations for identifying a set of candidate bug reports, in accordance with one or more embodiments.

FIG. 3 illustrates an example set of operations for identifying a set of candidate bug reports, in accordance with one or more embodiments. The set of candidate bug reports is a subset of previously-received bug reports that are to be compared against a particular bug report, to determine whether the particular bug report is a duplicate of any of the set of candidate bug reports.

One or more operations illustrated in FIG. 3 may be modified, rearranged, or omitted all together. Accordingly, the particular sequence of operations illustrated in FIG. 3 should not be construed as limiting the scope of one or more embodiments.

Initially, a particular category associated with a particular bug report is identified (Operation 302). The particular bug report is to be classified as a duplicate or non-duplicate report of previously-received bug reports. The particular category is identified from the information included in the particular bug report itself. Additionally or alternatively, the particular category is identified based on a program from which the particular bug report originated. For example, if a particular bug report is received from Program x, then the particular category associated with the particular bug report is Program x.

In one or more embodiments, a first set of bug reports in the particular category, associated with the particular bug report, is identified (Operations 304). Previously-received bug reports and their associated categories are stored in a database or other memory. A set of previously-received bug reports in the particular category (referred to as the "first set of bug reports") is identified from the database or other memory.

In an example, a particular bug report is in Category xyz. According to a database of previously-received bug reports, Category xyz is associated with 352 previously-received bug reports. The 352 previously-received bug reports are identified as the first set of bug reports.

In one or more embodiments, a second set of bug reports that have been previously classified as duplicates of at least one bug report in the first set of bug reports is identified (Operation 306). Each bug report that is received is classified as a duplicate or non-duplicate of one or more previously-received bug reports. The classification is made by a system using a bug classification model and/or by a person via a user interface. The classification is stored in a database or other memory. A set of bug reports that were previously classified as duplicates of at least one bug report in the first set of bug reports (referred to as the "second set of bug reports") is identified from the database or other memory.

In an example, a particular bug report is in Category xyz. Bug Report a and Bug Report b are also in Category xyz. Meanwhile, 209 bug reports were previously classified as duplicates of Bug Report a. One of the 209 bug reports is Bug Report c. Further, 155 bug reports were previously classified as duplicates of Bug Report b. One of the 155 bug reports is Bug Report d. The 209 bug reports plus the 155 bug reports are identified as the second set of bug reports. The second set of bug reports includes, for example, Bug Report c and Bug Report d.

In one or more embodiments, categories associated with each of the second set of bug reports are identified (Operation 308). The categories are identified from the information included in each of the second set of bug reports and/or retrieved from a database or other memory.

In an example, the second set of bug reports includes 364 bug reports, including in particular Bug Report c, Bug Report d, and Bug Report e. Bug Report c is in Category mno. Both Bug Report d and Bug Report e are in Category pqr. Then, the identified categories include Category mno and Category pqr. While the second set of bug reports includes 364 bug reports, the number of identified categories may be the same as or less than 364. The number of identified categories may be less than the number of bug reports in the second set of bug reports because two or more of the 364 bug reports in the second set of bug reports may belong to the same category.

In one or more embodiments, an inquiry is made as to whether a benefit-to-cost ratio for inclusion of bug reports in each identified category into a set of candidate bug reports is above a threshold (Operation 310). The benefit of including bug reports in Category xyz is represented by the number of bug reports that are (a) duplicates of at least one bug report in the second set of bug reports and (b) in Category xyz. The cost of including bug reports in Category xyz is represented by the total number of bug reports in Category xyz. The benefit-to-cost ratio associated with each identified category is determined and compared to a specified threshold.

In an example, the number of bug reports that are (a) duplicates of at least one bug report in the second set of bug reports and (b) in Category xyz is 378. The total number of bug reports in Category xyz is 5,345. The benefit-to-cost ratio is 378/5,345=0.07. The benefit-to-cost ratio is compared to a specified threshold.

In one or more embodiments, if the benefit-to-cost ratio associated with a category is below the threshold, then the bug reports in the category are not included in the set of candidate bug reports for the particular bug report (Operation 312). The bug classification model will not be applied to the bug reports in the category for determining whether the particular bug report is a duplicate of bug reports in that category.

In one or more embodiments, for categories that are associated with a benefit-to-cost ratio that is above the threshold, the categories are ranked by the corresponding benefit-to-cost ratio (Operation 314). The categories are ranked in descending order, such that the category with a highest corresponding benefit-to-cost ratio is ranked first.

In one or more embodiments, bug reports in each category are included into the set of candidate bug reports, according to the order of the ranking of the categories, until the number of included bug reports reaches a maximum cut-off (Operation 316). The maximum cut-off is a fixed number of bug reports that is desired to be included in the set of candidate bug reports. Alternatively, the maximum cut-off is determined based on a percentage of the bug reports in the identified categories that is desired to be included into the set of candidate set of bug reports.

In an example, a percentage of the bug reports in the identified categories that is desired to be included into the set of candidate set of bug reports is 90%. The number of bug reports across the identified categories is 23,089. Thus, the maximum cut-off is 90% of 23,089, which is equal to 20,788.

In an example, the identified categories include Category mno, Category pqr, and Category stu. A benefit-to-cost ratio associated with Category mno is 0.90. A benefit-to-cost ratio associated Category pqr is 0.35. A benefit-to-cost ratio associated with Category stu is 0.77. The ranked list of identified categories is: Category mno, Category stu, Category pqr. Category mno has 11,000 bug reports. Category stu has 12,100 bug reports. Category pqr has 5,000 bug reports. According to the ranking, the 11,000 bug reports in Category mno are first included into the set of candidate bug reports. The number of included bug reports at this point is 11,000. Then, the 12,100 bug reports in Category stu are included into the set of candidate bug reports. The number of included bug reports at this point is 11,000+12,100=23,100. A specified maximum cut-off for the number of bug reports in the set of candidate bug reports is 23,089. Hence, the number of included bug reports (23,100) has reached the specified maximum cut-off (23,089). Therefore, bug reports in the remaining categories in the ranked list of identified categories are not included into the set of candidate bug reports. That is, the 5,000 bug reports in Category pqr are not included.

In an example, whether Bug Report a is a duplicate of any previously-received bug report is to be determined. A set of candidate bug reports for Bug Report a is to be identified. Bug Report a is in Category a. Bug Report b is also in Category a. Bug Report c was previously classified as a duplicate of Bug Report b. Bug Report c is in Category c. Based on a cost-benefit analysis, bug reports in Category c are included into a set of candidate bug reports for Bug Report a. Bug Report d is in Category c. Hence, Bug Report d is a candidate bug report for Bug Report a. Bug Report d has been selected as a candidate bug report for Bug Report a based on determining that (a) a previously identified set of duplicate bug reports included Bug Report b and Bug Report c, (b) Bug Report b and Bug Report a are both associated with Category a, and (c) Bug Report c and Bug Report d are both associated with Category c.

5. Classifying a Particular Bug Report Using a Bug Classification Model

Figure 4:
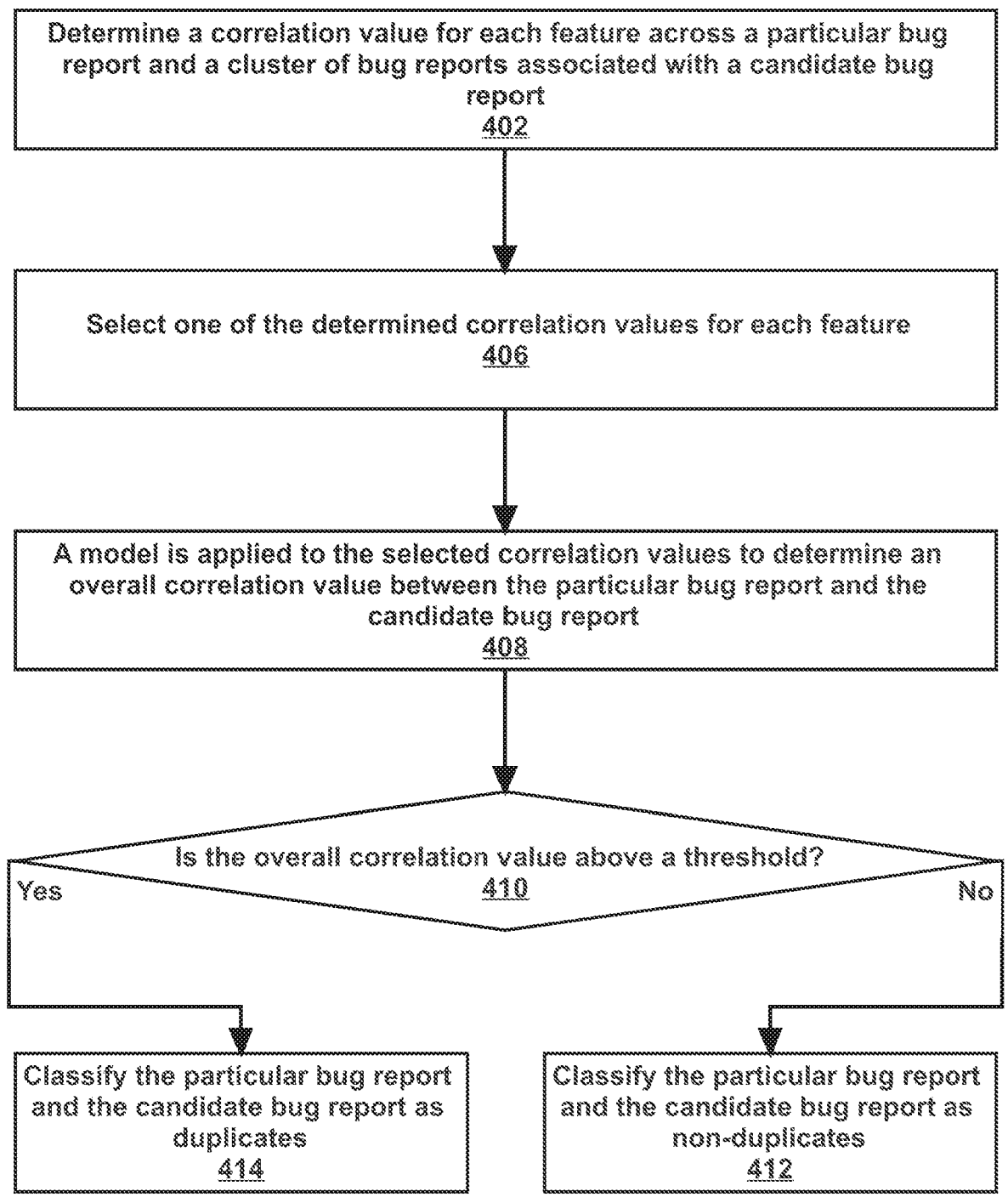
FIG. 4 illustrates an example set of operations for classifying a particular bug report using a bug classification model and a candidate set of bug reports, in accordance with one or more embodiments.

FIG. 4 illustrates an example set of operations for classifying a particular bug report using a bug classification model, in accordance with one or more embodiments. The set of operations may be reiterated for comparing the particular bug report against each candidate bug report. One or more operations illustrated in FIG. 4 may be modified, rearranged, or omitted all together. Accordingly, the particular sequence of operations illustrated in FIG. 4 should not be construed as limiting the scope of one or more embodiments.

Initially, a correlation value for each feature across a particular bug report and a cluster of bug reports associated with a candidate bug report is determined, in accordance with one or more embodiments (Operation 402). Values for each feature indicated by each bug report are determined. A first value for a particular feature indicated by the particular bug report is compared to a second value for the particular feature indicated by each of the bug reports in the cluster. The comparison results in one or more correlation values for the particular feature. In an embodiment, a cosine similarity computation is used to determine the correlation value. Example operations for determining a correlation value are described above with reference to Operation 204. If the cluster includes only bug report (the candidate bug report itself), then a single correlation value is found for each feature. If the cluster includes two or more bug reports, then multiple correlation values are found for each feature. Each of the multiple correlation values corresponds to a bug report of the cluster.

In one or more embodiments, one of the correlation values determined from Operation 402 is selected for each feature (Operation 406). The correlation value is selected based on an algorithm. The algorithm may be, for example, to select a maximum correlation value for each feature. As another example, an average correlation value is selected for each feature. The correlation value selected for a first feature may correspond to a first bug report in the cluster while the correlation value selected for a second feature may correspond to a second (different) bug report in the cluster.

In an example, a first correlation value for Feature a between Bug Report x and a candidate bug report is 0.65. A second correlation value for Feature a between Bug Report x and a first bug report in the cluster associated with the candidate bug report is 0.67. A third correlation value for Feature a between Bug Report x and a second bug report in the cluster associated with the candidate bug report is 0.63. A maximum correlation value is selected for Feature a. Hence, the correlation value for the particular feature is 0.67.

In one or more embodiments, a bug classification model is applied to the selected correlation values to determine an overall correlation value between the particular bug report and the candidate bug report (Operation 408). The model accepts the selected correlation values as input. The model applies a set of weights to the selected correlation values. Applying the set of weights may include computing a cross-product of the weights and the correlation values. Based on the result, the model outputs the overall correlation value between the particular bug report and the candidate bug report.

In an embodiment, a logistic regression model is represented by a logistic curve. The overall correlation value between the particular bug report and the candidate bug report is computed by $$\frac{1}{1+e^{-t}},$$

wherein t is a cross-product of the weights and the correlation values.

In one or more embodiments, an inquiry is made as to whether the overall correlation value is above a threshold (Operation 410). The threshold is a value that is specified by the bug classification model.

In one or more embodiments, if the overall correlation value is not above the threshold, then the particular bug report and the candidate bug report are classified as non-duplicates (Operation 412). A user interface presents the candidate bug report as a non-duplicate of the particular bug report. Additionally or alternatively, a user interface does not present the candidate bug report as a duplicate of the particular bug report.

In one or more embodiments, if the overall correlation value is above the threshold, then the particular bug report and the candidate bug report are classified as duplicates (Operation 414). A user interface presents the candidate bug report as a duplicate of the particular bug report.

In one or more embodiments, Operations 402-414 are reiterated for each candidate bug report for the particular bug report. Based on the bug classification model, multiple candidate bug reports may be classified as duplicates of the particular bug report. A user interface then presents the multiple candidate bug reports as duplicates of the particular bug report. The multiple candidate bug reports are presented in an ordered list, ranked in descending order by the overall correlation value for each candidate bug report.

6. Modifying a Bug Classification Model

Figure 5A:
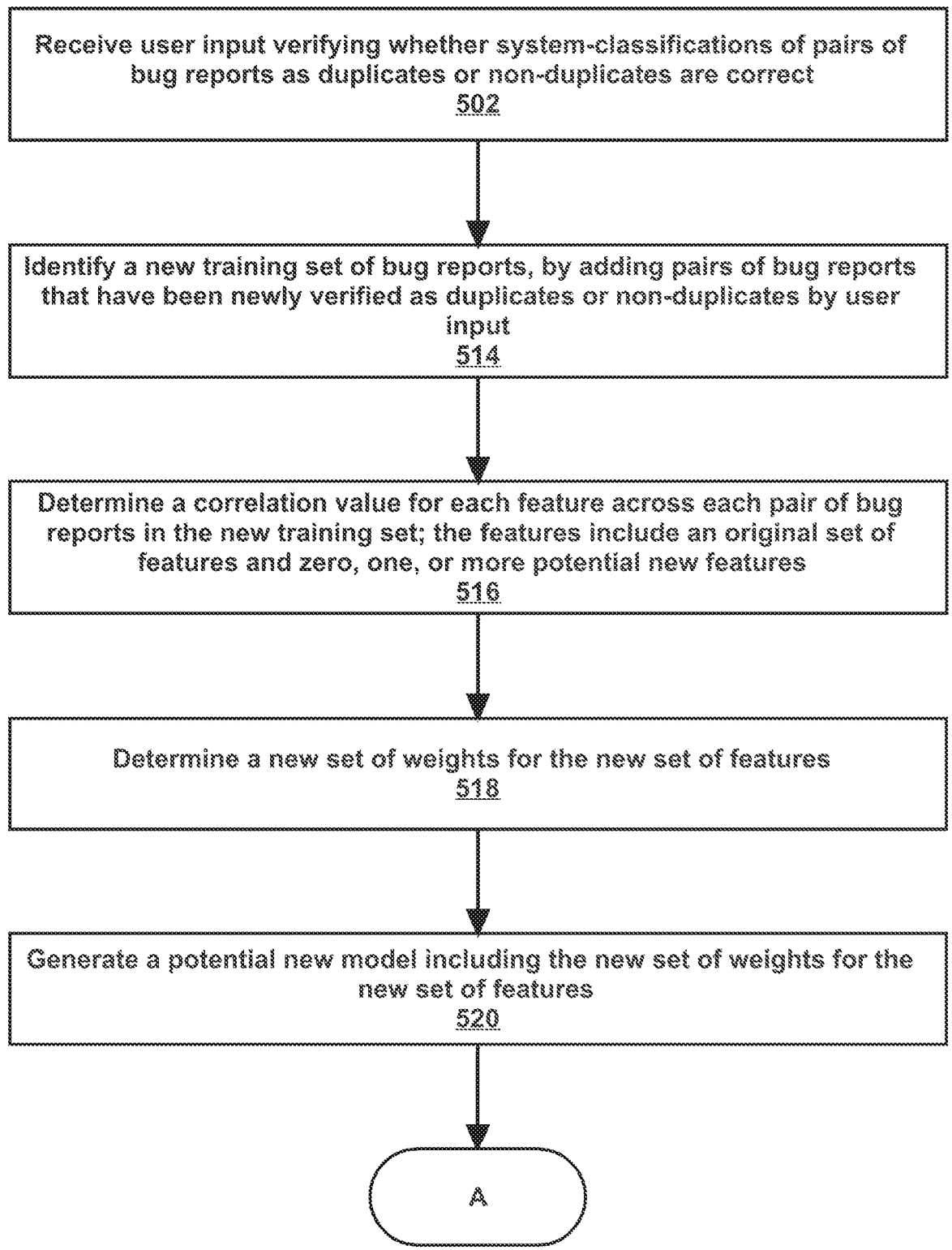
FIGS. 5A and 5B illustrate an example set of operations for modifying a bug report classification model, in accordance with one or more embodiments.
Figure 5B:
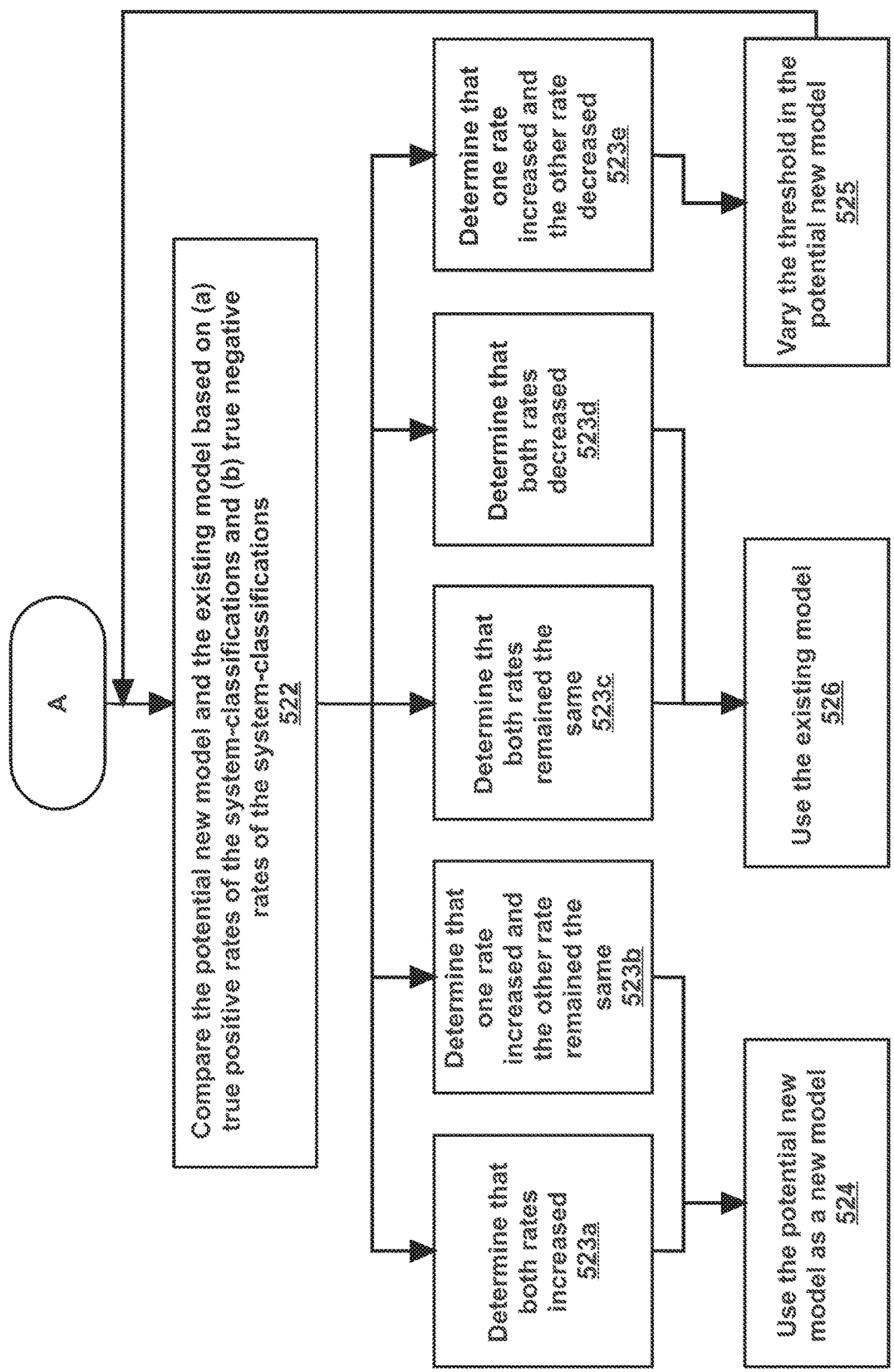

FIGS. 5A and 5B illustrate an example set of operations for modifying a bug report classification model, in accordance with one or more embodiments. One or more operations illustrated in FIGS. 5A and 5B may be modified, rearranged, or omitted all together. Accordingly, the particular sequence of operations illustrated in FIGS. 5A and 5B should not be construed as limiting the scope of one or more embodiments.

Initially, user input verifying whether system-classifications of pairs of bug reports as duplicates or non-duplicates are correct is received, in accordance with one or more embodiments (Operation 502). A pair of bug reports that have been classified by the system (using the bug classification model) as duplicates is presented at a user interface. User input is received via the user interface indicating that the pair are indeed duplicates or that the pair are non-duplicates. Conversely, a pair of bug reports that have been classified by the system (using the bug classification model) as non-duplicates is presented at a user interface. User input is received via the user interface indicating that the pair are indeed non-duplicates or that the pair are duplicates.

In an embodiment, user input verifying the system-classifications is received on an on-going basis. In an example, each time that a particular bug report is classified as a duplicate or non-duplicate of previously-received bug reports by the system, user input verifying the system-classifications of the particular bug report is received. In another example, prior to debugging a defect associated with a particular bug report, a person reviews the bug reports that have been classified as duplicates of the particular bug report by the system. The person then enters user input verifying the system-classifications.

In an embodiment, at regular time intervals (for example, once per week, or once per month), the user input received over the previous time interval is used to modify and/or update the bug classification model. The user input is used to modify and/or update the bug classification model according to Operations 514-526, as described below.

In one or more embodiments, a new training set of bug reports is identified, by adding pairs of bug reports that have been newly verified as duplicates or non-duplicates by user input (Operation 514). In an embodiment, a new training set of bug reports is identified at a regular time interval (such as once per week, or once per month). The user-verifications of the system-classifications received during the previous time interval (such as during the last week, or during the last month) are used for the new training set. The pairs of bug reports corresponding to the user-verifications are added to the original training set to generate a new training set. Adding the pairs of bug reports to generate a new training set includes using the user-verifications as user-classifications for the pairs of bug reports in the new training set.

In one or more embodiments, a correlation value for each feature across each pair of bug reports in the new training set is determined. The features include an original set of features and zero, one, or more potential new features (Operation 516). The original set of features includes features that are used by the current bug classification model (for example, the current model is applied to the correlation values for the original set of features to determine an overall correlation value between two bug reports). A potential new feature is a feature of a bug report that is not used by the current bug classification model (also referred to herein as an "unincorporated feature").

In an embodiment, values for each feature indicated by each bug report are determined. A first value for a particular feature indicated by a first bug report is compared to a second value for the particular feature indicated by a second bug report in order to determine a correlation value for the particular feature. In an embodiment, a cosine similarity computation is used to determine the correlation value. Example operations for determining a correlation value are described above with reference to Operation 204.

In one or more embodiments, a new set of weights for the new set of features (including the potential new features, if any) is determined (Operation 518). Techniques such as machine learning, logistic regression, and linear regression are used to determine the new set of weights. Example operations for determining a set of weights are described above with reference to Operation 206.

In one or more embodiments, a potential new bug classification model including the new set of weights for the new set of features is generated (Operation 520). The potential new model includes the new weights as fixed constants. Generating the potential new model includes storing the new weights with the corresponding features within a data structure. The potential new model also includes a threshold value. Example operations for generating a bug classification model are described above with reference to Operation 208.

In one or more embodiments, the potential new model and the existing model are compared based on (a) true positive rates of the system-classifications and (b) true negative rates of the system-classifications (Operation 522).

A true positive rate (also referred to herein as a "recall value") of the system-classifications, produced by a bug classification model, is a ratio of: (a) the number of pairs of bug reports (in a training set of bug reports) that are classified as duplicates by both the user and the system, to (b) the number of pairs of bug reports (in the training set of bug reports) that are classified as duplicates by at least the user. The number of pairs of bug reports that are classified as duplicates by both the user and the system is the number of correctly identified true duplicates. The number of pairs of bug reports that are classified as duplicates by at least the user is the number of true duplicates.

A true positive rate of the system-classifications produced by the potential new model is determined. The potential new model is applied to the correlation values, for the original set of features and any potential new features, corresponding to the new training set of bug reports (which are the correlation values determined at Operation 516). The potential new model outputs overall correlation values for each pair in the new training set. The overall correlation values are compared to a threshold value used in the potential new model. A system-classification for each pair is determined based on whether the corresponding overall correlation value is greater than the threshold value. The system-classifications and the user-verifications are used to determine the true positive rate.

In an example, a new training set of bug reports includes 6 pairs: Pair A, Pair B, Pair C, Pair D, Pair E, and Pair F. User-classifications of each pair are as follows:
Pair A—User-Classification: Duplicates
Pair B—User-Classification: Duplicates
Pair C—User-Classification: Non-Duplicates
Pair D—User-Classification: Duplicates
Pair E—User-Classification: Duplicates
Pair F—User-Classification: Non-Duplicates The potential new model is applied to the new training set of bug reports to obtain system-classifications of each pair. System-classifications of each pair are as follows:
Pair A—System-Classification: Duplicates
Pair B—System-Classification: Non-Duplicates
Pair C—System-Classification: Duplicates
Pair D—System-Classification: Duplicates
Pair E—System-Classification: Duplicates
Pair F—System-Classification: Non-Duplicates The system-classification and the user-classification of each pair are compared. Bug reports that are classified as duplicates by both the user and the system are: Pair A, Pair D, and Pair E. The number of bug reports classified as duplicates by both the user and the system is 3. Bug reports that are classified as duplicates by at least the user are: Pair A, Pair B, Pair D, and Pair E. The number of bug reports classified as duplicates by at least the user is 4. Hence, the true positive rate is ¾, which is equal to 0.75.

Similarly, a true positive rate of the system-classifications produced by the existing model is determined. The existing model is applied to the correlation values, for the original set of features, corresponding to the new training set of bug reports. The existing model outputs overall correlation values for each pair in the new training set. A system-classification for each pair is determined based on the corresponding overall correlation value. The system-classifications and the user-verifications are used to obtain the true positive rate, as described above.

A true negative rate of the system-classifications, produced by a bug classification model, is a ratio of: (a) the number of pairs of bug reports (in a training set of bug reports) that are classified as non-duplicates by both the user and the system, to (b) the number of pairs of bug reports (in the training set of bug reports) that are classified as non-duplicates by at least the user. The number of pairs of bug reports that are classified as non-duplicates by both the user and the system is the number of correctly identified true non-duplicates. The number of pairs of bug reports that are classified as non-duplicates by at least the user is the number of true non-duplicates.

A true negative rate of the system-classifications produced by the potential new model is determined. System-classifications for each pair, in the new training set of bug reports, is determined using the potential new model. The system-classifications and the user-verifications are used to determine the true negative rate.

In an example, a new training set of bug reports includes 6 pairs: Pair A, Pair B, Pair C, Pair D, Pair E, and Pair F. User-classifications of each pair are as follows:

Pair A—User-Classification: Duplicates
Pair B—User-Classification: Duplicates
Pair C—User-Classification: Non-Duplicates
Pair D—User-Classification: Duplicates
Pair E—User-Classification: Duplicates
Pair F—User-Classification: Non-Duplicates The potential new model is applied to the new training set of bug reports to obtain system-classifications of each pair. System-classifications of each pair are as follows:

Pair A—System-Classification: Duplicates
Pair B—System-Classification: Non-Duplicates
Pair C—System-Classification: Duplicates
Pair D—System-Classification: Duplicates
Pair E—System-Classification: Duplicates
Pair F—System-Classification: Non-Duplicates The system-classification and the user-classification of each pair are compared. Bug reports that are classified as non-duplicates by both the user and the system are: Pair F. The number of bug reports classified as non-duplicates by both the user and the system is 1. Bug reports that are classified as non-duplicates by at least the user are: Pair C, and Pair F. The number of bug reports classified as non-duplicates by at least the user is 2. Hence, the true negative rate is ½, which is equal to 0.50.

Similarly, a true negative rate of the system-classifications produced by the existing model is determined. System-classifications for each pair, in the new training set of bug reports, is determined using the existing model. The system-classifications and the user-verifications are used to determine the true negative rate.

A first comparison, for the true positive rate, is made. The true positive rate associated with the potential new model is compared to the true positive rate associated with the existing model. A second comparison, for the true negative rate, is made. The true negative rate associated with the potential new model is compared to the true negative rate associated with the associated model. Five different determinations may be made based on the two comparisons, as explained below.

A first determination is that both rates increased (Operation 523a). The first determination is made if (a) the true positive rate associated with the potential new model is greater than the true positive rate associated with the existing model, and (b) the true negative rate associated with the potential new model is greater than the true negative rate associated with the existing model.

Alternatively, a second determination is that one rate increased and the other rate remained the same (Operation 523b). The second determination is made if (a) the true positive rate associated with the potential new model is greater than the true positive rate associated with the existing model, and (b) the true negative rate associated with the potential new model is the same as the true negative rate associated with the existing model. Alternatively, the second determination is made if (a) the true positive rate associated with the potential new model is the same as the true positive rate associated with the existing model, and (b) the true negative rate associated with the potential new model is greater than the true negative rate associated with the existing model.

Alternatively, a third determination is that both rates remained the same (Operation 523c). The third determination is made if (a) the true positive rate associated with the potential new model is the same as the true positive rate associated with the existing model, and (b) the true negative rate associated with the potential new model is the same as the true negative rate associated with the existing model.

Alternatively, a fourth determination is that both rates decreased (Operation 523d). The fourth determination is made if (a) the true positive rate associated with the potential new model is less than the true positive rate associated with the existing model, and (b) the true negative rate associated with the potential new model is less than the true negative rate associated with the existing model.

Alternatively, a fifth determination is that one rate increased and the other rate decreased (Operation 523e). The fifth determination is made if (a) the true positive rate associated with the potential new model is greater than the true positive rate associated with the existing model, and (b) the true negative rate associated with the potential new model is less than the true negative rate associated with the existing model. Alternatively, the fifth determination is made if (a) the true positive rate associated with the potential new model is less than the true positive rate associated with the existing model, and (b) the true negative rate associated with the potential new model is greater than the true negative rate associated with the existing model.

If the third determination is made at Operation 523c, or the fourth determination is made at Operation 523d, then the existing model continues to be used (Operation 526). The existing model uses the existing weights and the original set of features. The existing model applies the existing weights to correlation values determined for the original set of features to classify a particular bug report as a duplicate or non-duplicate of previously-received bug reports.

If the first determination is made at Operation 523a, or the second determination is made at Operation 523b, then the potential new model is used as a new modified model (Operation 524). The modified model uses the new weights (determined at Operation 518) and the new set of features (including the original set of features and any potential new features identified at Operation 516). The modified model applies the new weights to correlation values determined for the new set of features to classify a particular bug report as a duplicate or non-duplicate of previously-received bug reports.

If the fifth determination is made at Operation 523e, then the threshold value used in the potential new model is varied, and the new threshold value is applied to the potential new model (Operation 525). The current threshold value is increased by a particular amount to obtain a new threshold value. The potential new model is applied to the correlation values, for the original set of features and any potential new features, corresponding to the new training set of bug reports (which are the correlation values determined at Operation 516). The potential new model outputs overall correlation values for each pair in the new training set. The overall correlation values are compared to the new threshold value. A system-classification for each pair is determined based on whether the corresponding overall correlation value is greater than the new threshold value.

In an example, an existing threshold value is 0.51. The potential new model with the existing threshold value is applied to the new training set of bug reports, which includes a particular pair, Pair A. The potential new model produces an overall correlation value for Pair A, which is equal to 0.52. Since the overall correlation value of Pair A (0.52) is greater than the existing threshold value (0.51), Pair A is classified by the system as duplicates. The threshold value is increased, and a new threshold value is 0.53. The overall correlation value of Pair A was previously determined to be 0.52. However, the overall correlation value is now compared to the new threshold value. Since the overall correlation value of Pair A (0.52) is less than the new threshold value (0.53), Pair A is classified by the system as non-duplicates. As illustrated by this example, the increase in the threshold value reduces the number of pairs of bug reports that are classified by the system as duplicates.

In an embodiment, the amount by which the threshold value is increased is determined based on a difference between (a) a first value that is used to represent a user-classification indicating a pair of bug reports as duplicates (such as "1") and (b) a second value that is used to represent a user-classification indicating a pair of bug reports as non-duplicates (such as "0"). The amount of increase is a particular fraction of the difference. In an example, the value 1 is used to represent a user-classification indicating a pair of bug reports as duplicates. The value 0 is used to represent a user-classification indicating a pair of bug reports as non-duplicates. The difference between the two values is 1. The amount by which the threshold value is increased is one-hundredth of the difference. One-hundredth of the difference is determined to be 0.01. If the threshold value is originally 0.50, then the new threshold value is 0.51.

In an embodiment, the new threshold value is applied to the potential new model. The process repeats Operation 522, to compare the potential new model with the new threshold value and the existing model. A new determination, at Operations 523a-523e, is made based on the potential new model with the new threshold value. If the fifth determination is made again at Operation 523e, then the process repeats Operation 525 and iterates again at Operation 522.

In an embodiment, the potential new model does not replace the existing model unless there is a particular threshold value for the potential new model that satisfies all of the following criteria: (a) at least one of the true positive rate and the true negative rate is increased by the potential new model, and (b) neither the true positive rate nor the true negative rate are decreased by the potential new model. If the criteria are satisfied, then the potential new model is found to be an improvement over the existing model.

In other embodiments (not shown), other measurements may be used to determine whether the potential new model is an improvement over the existing model. For example, in addition to, or as an alternative to, using the true positive rate and the true negative rate, an absolute number of false negatives and an absolute number of false positives may be used. A false negative is a pair of bug reports that have been classified as non-duplicates by a system but classified as duplicates by a user. A false positive is a pair of bug reports that have been classified as duplicates by a system but classified as non-duplicates by a user. The number of false negatives produced by the potential new model is compared to the number of false negatives produced by the existing model. The number of false positives produced by the potential new model is compared to the number of false positives produced by the existing model.

In an example, if both numbers (the number of false negatives and the number of false positives) increased, then the potential new model is used as the new model. If one number increased and the other number remained the same, then the potential new model is used as the new model. If both numbers remained the same, then the existing model is used. If both numbers decreased, then the existing model is used. If one number increased and the other number decreased, then the threshold value in the potential new model is varied. Examples of operations for varying the threshold value are described above with reference to Operation 525.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
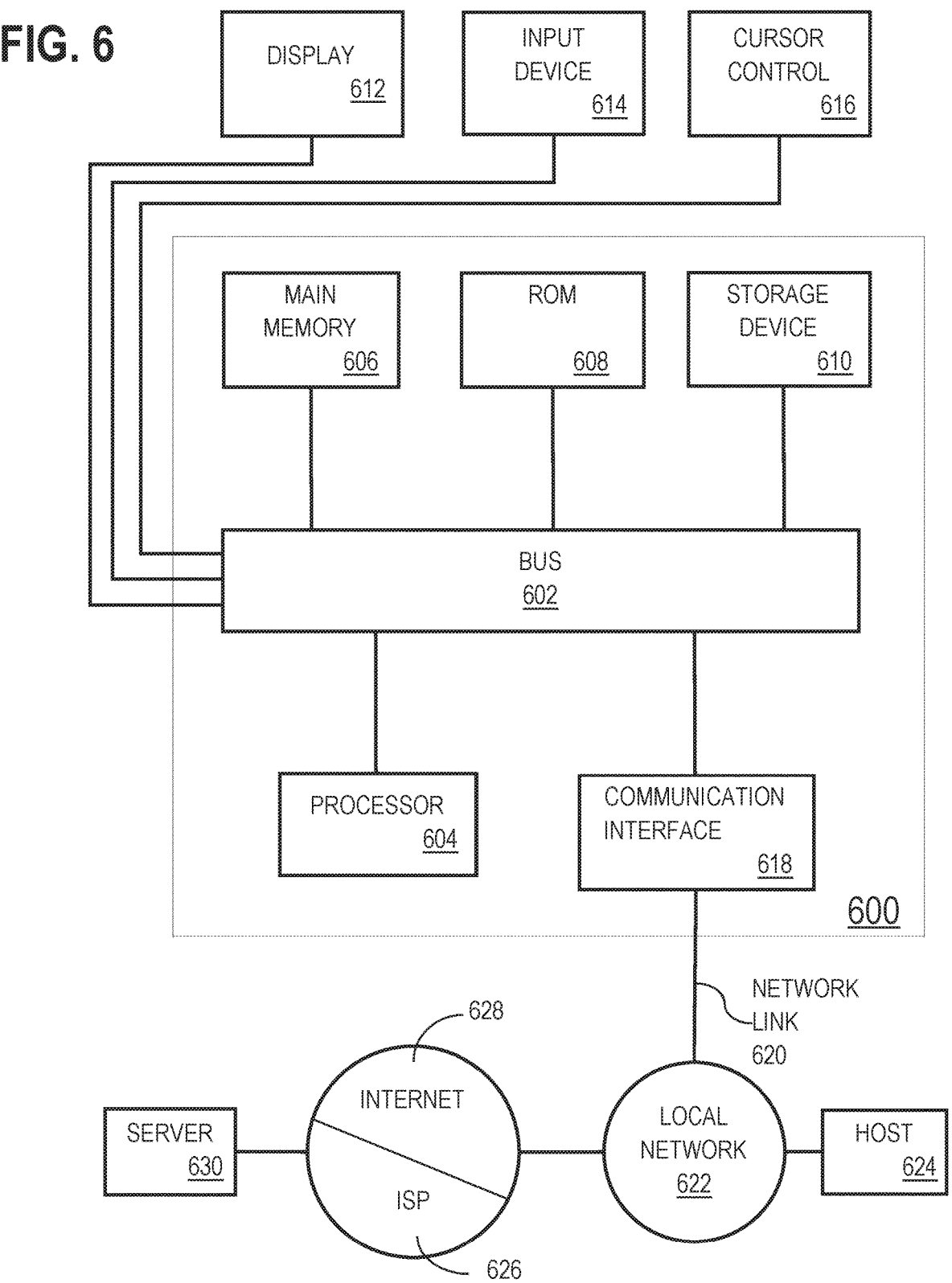
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   receiving a request to determine whether a particular bug report is a duplicate of a first bug report of a plurality of bug reports;
   determining a first correlation value, corresponding to a first feature, between the particular bug report and the first bug report;
   determining that a second bug report has been previously identified as duplicate of the first bug report;
   responsive to determining that the second bug report has been previously identified as duplicate of the first bug report: selecting the second bug report for comparison with the particular bug report;
   determining a second correlation value, corresponding to the first feature, between the particular bug report and the second bug report; based on at least the first correlation value and the second correlation value, determining a first aggregated correlation value, corresponding to the first feature, between the particular bug report and the first bug report; and
   applying a classification model to at least the first aggregated correlation value to obtain a classification of the particular bug report and the first bug report as duplicate bug reports or non-duplicate bug reports; wherein the method is performed by at least one device including a hardware processor.

2. One or more non-transitory machine-readable media storing instructions which, when executed by one or more processors, cause:
   receiving a request to determine whether a particular bug report is a duplicate of a first bug report of a plurality of bug reports;
   determining a first correlation value, corresponding to a first feature, between the particular bug report and the first bug report;
   determining that a second bug report has been previously identified as duplicate of the first bug report;
   responsive to determining that the second bug report has been previously identified as duplicate of the first bug report: selecting the second bug report for comparison with the particular bug report;
   determining a second correlation value, corresponding to the first feature, between the particular bug report and the second bug report;
   based on at least the first correlation value and the second correlation value, determining a first aggregated correlation value, corresponding to the first feature, between the particular bug report and the first bug report;
   applying a classification model to at least the first aggregated correlation value to obtain a classification of the particular bug report and the first bug report as duplicate bug reports or non-duplicate bug reports.

3. The one or more media of claim 2, further storing instructions which, when executed by the one or more processors, cause: determining a third correlation value, corresponding to a second feature, between the particular bug report and the first bug report; determining a fourth correlation value, corresponding to the second feature, between the particular bug report and the second bug report; based on at least the third correlation value and the fourth correlation value, determining a second aggregated correlation value, corresponding to the second feature, between the particular bug report and the first bug report; applying the classification model to at least the first aggregated correlation value and the second aggregated correlation value to obtain the classification of the particular bug report and the first bug report.

4. The one or more media of claim 2, further storing instructions which, when executed by the one or more processors, cause: identifying a third bug report that has been previously identified as duplicate of the first bug report; determining a third correlation value, corresponding to the first feature, between the particular bug report and the third bug report; based on at least the first correlation value and the second correlation value and the third correlation value, determining the first aggregated correlation value.

5. The one or more media of claim 2, wherein the second bug report was previously identified as duplicate of the first bug report by a user.

6. The one or more media of claim 2, wherein the second bug report was previously identified as duplicate of the first bug report by the classification model.

7. The one or more media of claim 2, further storing instructions which, when executed by the one or more processors, cause: identifying a cluster of bug reports that have been previously identified as duplicate of the first bug report, the cluster of bug reports including the second bug report; determining a respective correlation value, corresponding to the first feature, between the particular bug report and each of the cluster of bug reports; based on the respective correlation values, determining the first aggregated correlation value, corresponding to the first feature, between the particular bug report and the first bug report.

8. The one or more media of claim 7, wherein determining the first aggregated correlation value, corresponding to the first feature, between the particular bug report and the first bug report comprises: selecting a maximum value from the respective correlation values as the first aggregated correlation value.

9. The one or more media of claim 7, wherein determining the first aggregated correlation value, corresponding to the first feature, between the particular bug report and the first bug report comprises: determining an average of the respective correlation values as the first aggregated correlation value.

10. The one or more media of claim 2, wherein a same algorithm is applied to obtain each of the first correlation value and the second correlation value.

11. The one or more media of claim 2, wherein a cosine similarity computation is applied to obtain each of the first correlation value and the second correlation value.

12. The one or more media of claim 2, wherein the classification model comprises a plurality of weight assignments, each of which corresponds to a respective feature of a plurality of features, and the plurality of features includes the first feature.

13. The one or more media of claim 2, wherein applying the classification model to at least the first aggregated correlation value to obtain the classification of the particular bug report and the first bug report comprises: applying a weight assignment, specified by the classification model, to the first aggregated correlation value.

14. The one or more media of claim 2, wherein the classification model is applied to the first aggregated correlation value to obtain the classification of the particular bug report and the first bug report, without applying the classification model to the first correlation value.

15. The one or more media of claim 2, further storing instructions which, when executed by the one or more processors, cause: based on applying the classification model to at least the first aggregated correlation value, determining that the particular bug report and the first bug report are duplicate bug reports.

16. The one or more media of claim 2, further storing instructions which, when executed by the one or more processors, cause: based on applying the classification model to at least the first aggregated correlation value, determining that the particular bug report and the first bug report are not duplicate bug reports.

17. The one or more media of claim 2, further storing instructions which, when executed by the one or more processors, cause: identifying a first category associated with the particular bug report; identifying a first subset of bug reports, of the plurality of bug reports, associated with the first category; identifying a second subset of bug reports, of the plurality of bug reports, that have been previously identified as a duplicate of at least one bug report of the first subset of bug reports; identifying a set of candidate bug reports that: (a) includes one or more of the first subset of bug reports; (b) includes one or more of the second subset of bug reports; and (c) does not include a third subset of bug reports, of the plurality of bug reports, that (i) are not associated with the first category and (ii) have not been previously identified as a duplicate of one or more bug reports of the first subset of bug reports; wherein the set of candidate bug reports includes the first bug report; based on the first bug report being within the set of candidate bug reports, selecting the first bug report for comparison against the particular bug report.

18. The one or more media of claim 17, further storing instructions which, when executed by the one or more processors, cause: based on a third bug report not being within the set of candidate bug reports, refraining from selecting the third bug report for comparison against the particular bug report.

19. The one or more media of claim 2, wherein determining the first aggregated correlation value, corresponding to the first feature, based on at least the first correlation value and the second correlation value comprises: applying an algorithm to at least the first correlation value and the second correlation value to determine the first aggregated correlation value.

20. A system, comprising: at least one device including a hardware processor; and the system being configured to perform operations comprising:
receiving a request to determine whether a particular bug report is a duplicate of a first bug report of a plurality of bug reports;
determining a first correlation value, corresponding to a first feature, between the particular bug report and the first bug report;
determining that a second bug report has been previously identified as duplicate of the first bug report;
responsive to determining that the second bug report has been previously identified as duplicate of the first bug report: selecting the second bug report for comparison with the particular bug report;
determining a second correlation value, corresponding to the first feature, between the particular bug report and the second bug report;
based on at least the first correlation value and the second correlation value, determining a first aggregated correlation value, corresponding to the first feature, between the particular bug report and the first bug report;
applying a classification model to at least the first aggregated correlation value to obtain a classification of the particular bug report and the first bug report as duplicate bug reports or non-duplicate bug reports.

21. The system of claim 20, wherein the operations further comprise: determining a third correlation value, corresponding to a second feature, between the particular bug report and the first bug report; determining a fourth correlation value, corresponding to the second feature, between the particular bug report and the second bug report; based on at least the third correlation value and the fourth correlation value, determining a second aggregated correlation value, corresponding to the second feature, between the particular bug report and the first bug report; applying the classification model to at least the first aggregated correlation value and the second aggregated correlation value to obtain the classification of the particular bug report and the first bug report.

* * * * *